March 29, 1966  J. BROWN ET AL  3,243,147
METHOD AND APPARATUS FOR PASSIVE DEFENSE FROM NUCLEAR EXPLOSIONS
Filed March 31, 1965  4 Sheets-Sheet 1

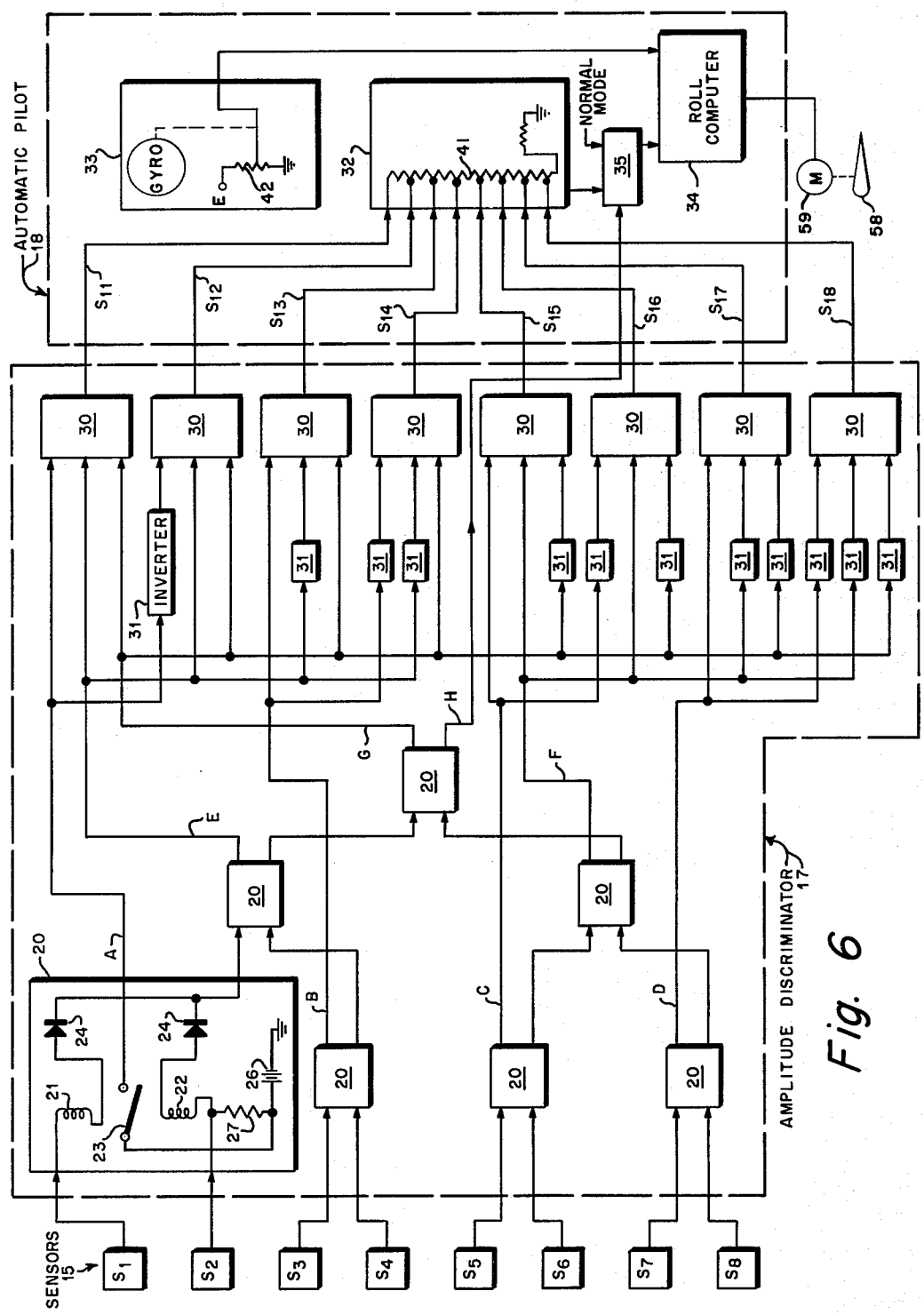

United States Patent Office 3,243,147
Patented Mar. 29, 1966

1

3,243,147
METHOD AND APPARATUS FOR PASSIVE DEFENSE FROM NUCLEAR EXPLOSIONS
Joseph Brown, Philadelphia, and Donald N. Spangenberg, Southampton, Pa., assignors to the United States of America as represented by the Secretary of the Navy
Filed Mar. 31, 1965, Ser. No. 446,478
6 Claims. (Cl. 244—77)

The invention described herein may be manufactured and used by or for the Government of the United States of America for governmental purposes without the payment of any royalties thereon or therefor.

The present invention relates to a method and apparatus for passive defense of an aircraft in flight, and more particularly to method and apparatus for maneuvering an aircraft in flight so that its least vulnerable aspect faces the location of a nuclear burst.

One of the most significant causes of damage to aircraft produced by a near-miss nuclear burst is the sudden gust loading imparted upon the surfaces of the aircraft from air pressure generated at the burst region. Such a gust loading can produce an immediate type of "kill" at greater distances than that produced by other causes of aircraft damage, such as nuclear or thermal radiation. As might be expected, the ability of aircraft to withstand high gust loadings will vary with the kind of aircraft and for different aspects of the aircraft facing the direction of the nuclear burst. A study of various types of aircraft indicates generally that minimum vulnerability occurs when the aircraft wings lie substantially in a plane formed by the velocity vector of the aircraft and the point of explosion of the nuclear weapon.

Accordingly, it is an object of the present invention to provide a method and apparatus for the passive defense of an aircraft to a near-miss nuclear explosion with which the direction of the nuclear explosion is detected by the aircraft substantially instantaneously, with which the aircraft is maneuvered from its normal attitude so that its least vulnerable aspect faces the point of the explosion when the sudden gust generated by the explosion arrives, and with which the aircraft can resume its normal attitude after the gust has passed.

It is a further object of the invention to provide apparatus for detecting the direction of a nuclear explosion and for providing information to the aircraft automatic pilot to cause the aircraft to roll a discrete amount relative to the direction detected, which can be conveniently added to the existing automatic pilot system with a minimum of component parts, and which will not degrade the existing aircraft control system.

Various other objects and advantages will appear from the following description of one embodiment of the invention, and the most novel features will be particularly pointed out hereinafter in connection with the appended claims.

2

Figure 1:
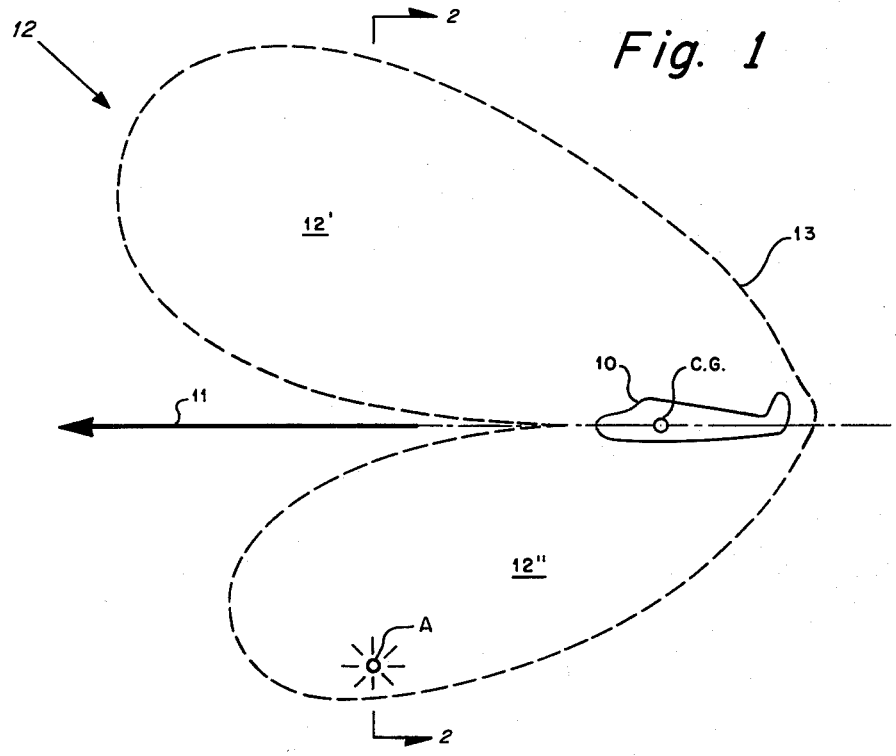
FIG. 1 represents an elevational view of an aircraft in flight superimposed by a profile of a lethal volume, further reduced in scale, of the aircraft when traveling at a given speed and altitude.
Figure 5:
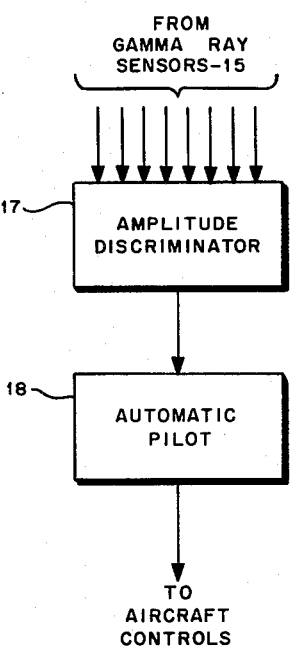
Figure 4:
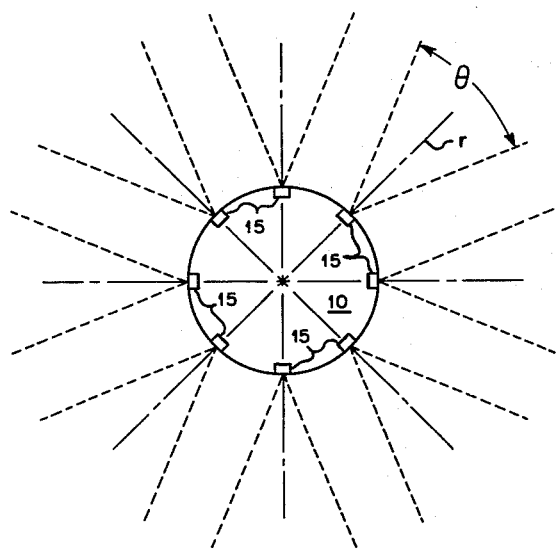
Figure 7:
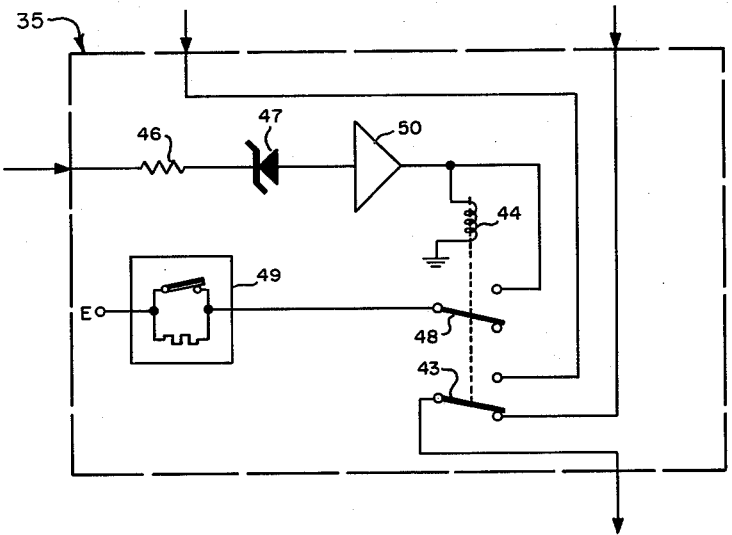
Figure 8:
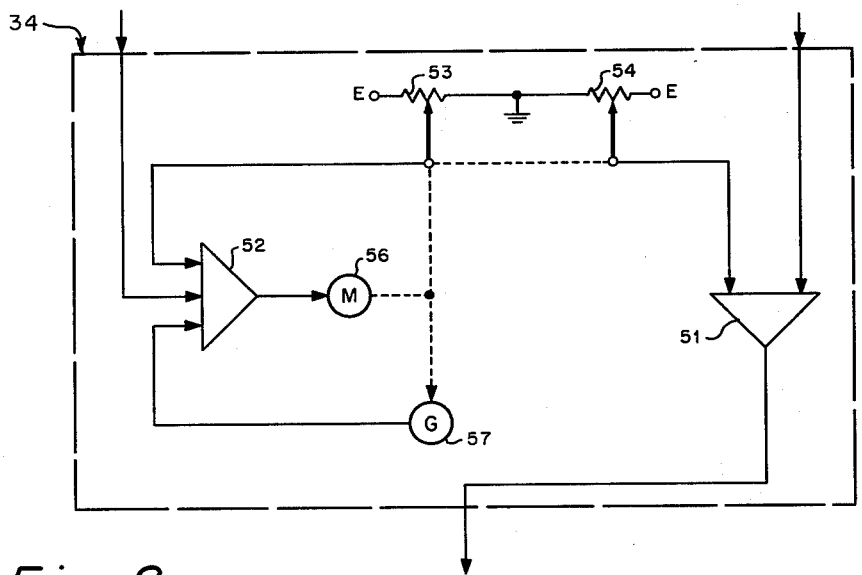

FIG. 4 represents a transverse cross section of the fuselage of the aircraft in FIG. 1 illustrating an array of gamma ray sensors mounted thereabout;

FIG. 5 is a block diagram illustrating the interconnection of the gamma ray sensors and the controls of the aircraft;

FIG. 6 schematically represents one detailed embodiment of the invention as illustrated in the block diagram of FIG. 5;

FIG. 7 is a more detailed circuit diagram of a time-holding relay as applied in the schematic embodiment of FIG. 6; and FIG. 8 is a more detailed circuit diagram of a roll computer as applied in the schematic embodiment of FIG. 6.

Figure 2:
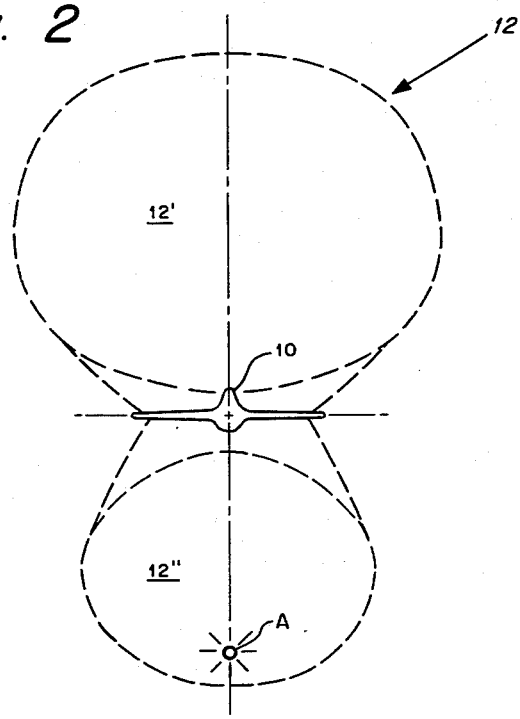
FIG. 2 represents a transverse cross section of the lethal volume taken along the lines 2—2 of FIG. 1.

In the illustrated embodiment, FIG. 1 shows an aircraft 10 traveling in a straight course from right to left along a flight path vector 11. A parameter of vulnerability of the aircraft 10 to a sudden gust loading, hereinafter referred to as a lethal volume 12, is graphically represented in a vertical profile by the broken line 13. Taken with the transverse cross section view of FIG. 2, the lethal volume 12 is shown as comprising upper and lower lobes 12' and 12'', respectively. Taken with the elevation view of FIG. 3 wherein the lethal volume 12 has been rotated 90°, the lobes 12' and 12'' are shown as forming a surface of intersection substantially in the plane of the wings of the aircraft 10, which surface is represented in profile by the broken line 14. The scale of the lethal volume 12 is greatly reduced relative to the aircraft 10, hence broken line 14 does not in fact intersect the wings of the aircraft 10 as appears in FIG. 3. The lethal volume 12 thus illustrated defines a boundary surface or envelope about the center of gravity (C.G.) of the aircraft 10 within which the sudden gust loading from a nuclear explosion for a given single-shot warhead yield will immediately destroy or "kill" the aircraft 10. The lethal volume 12, of course, varies in magnitude substantially in proportion to the warhead yield, altitude, and type of aircraft. The speed at which the aircraft 10 is traveling affects the shape of the volume 12. For example, as the speed decreases, the outer extremities of the lobes 12' and 12'' move aftward with respect to the center of gravity of the aircraft 10.

The boundary surface configuration of the lethal volume 12 thus indicates that a nuclear explosion in the plane of the surface of the intersection of the lobes 12' and 12'' will have the least destructive effect on the airplane 10. In other words, the least vulnerable aspect of the aircraft 10 confronts a nuclear explosion when the aircraft wings lie in the plane formed by the flight path vector 11 and the burst point of the nuclear warhead.

FIG. 4, representing a transverse section of the fuselage of the aircraft 10, shows an array of gamma ray sensors 15 equally spaced therearound. The illustrated embodiment has an array of eight sensors 15 each viewing a space bounded substantially by a tetrahedral angle. The angle $\theta$ bisected by the radial axis $r$ of each sensor 15 is $360°/n$, where $n$ is the number of sensors. For eight sensors, $\theta$ is 45°. In this manner, the confronting faces of tetrahedral angles of adjacent sensors 15 are parallel and thereby assure substantially complete radial surveillance. It is contemplated that each gamma ray sensor 15 be either of the nondirectional type which simply produces an electrical signal indicative of all gamma radiation appearing at any sensor 15, or of the directional type which will produce an electric signal proportional to the angular deviation of the gamma ray source from the axis r at any sensor 15.

The gamma ray sensors 15 have their outputs connected to an amplitude discriminator 17. Whether the sensors 15 are directional or nondirectional, the discriminator 17 will interpret and pass an overriding signal to an automatic pilot 18 of the aircraft 10 indicative of the direction of the radiation source. More specifically, eight sensors 15 of the type disclosed in U.S. Patent 2,735,944 to W. J. Greer for Apparatus for Determining Density of Fluids, issued February 21, 1956, are selected to produce direct current signals whose amplitudes vary with the intensity of gamma radiation. The sensors 15 are separately identified in FIG. 6 by their output signals $S_1$, $S_2$, $S_3$ . . . $S_8$ which are fed to the amplitude discriminator 17 and therein compared with each other by an arrangement of D.C. amplitude comparators 20. The comparator 20 which receives the signals $S_1$ and $S_2$ is shown in schematic detail and is representative of the other comparators 20. The signals $S_1$ and $S_2$ are connected to respective terminals of opposed relay coils 21 and 22 which selectively operate a relay contact 23 positioned therebetween. The other terminal of each coil 21 and 22 is connected to the input of a blocking diode 24. The diode outputs are connected in common to one input of another comparator 20 so that the higher input signal passes thereto. The relative amplitudes of the signals $S_1$ and $S_2$ will determine the position of the contact 23. That is, if the signal $S_1$ is greater than $S_2$, contact 23 will close and produce a voltage signal A at another output from a battery 26; and if $S_2$ is greater than $S_1$, then no voltage will appear at the other output. In binary code expressions, a no voltage may be symbolically designated as $\bar{A}$. For the situation when the amplitudes of signals $S_1$ and $S_2$ are exactly equal, such a blast equidistant from two adjacent sensors 15, it is necessary that the comparator 20 be biased to pass one of the signals to avoid relay chatter. This is accomplished simply by adding a biasing voltage to the input of the coil 22 through a dropping resistor 27.

The other input signals $S_3$ and $S_4$, $S_5$ and $S_6$, and $S_7$ and $S_8$ are similarly compared to produce binary coded output signals B or $\bar{B}$, C or $\bar{C}$ and D or $\bar{D}$, and the higher in magnitude of each pair of input signals are further compared to each other to produce additional binary coded output signals E or $\bar{E}$, F or $\bar{F}$ and G or $\bar{G}$. The binary coded signals are fed to a plurality of "AND" gates 30 such as comprising conventional flip-flop circuits. Each gate 30 has three inputs for receiving three binary code signals, and when a voltage appears at all three inputs of any given gate 30, a signal $S_{11}$, $S_{12}$, $S_{13}$ . . . or $S_{18}$ is produced. Using digital coding techniques, the gates 30 produce the signals $S_{11}$, $S_{12}$, $S_{13}$ . . . $S_{18}$ according to the following schedule:

$$S_{11} = A + E + G$$
$$S_{12} = \bar{A} + E + G$$
$$S_{13} = B + \bar{E} + G$$
$$S_{14} = \bar{B} + \bar{E} + G$$
$$S_{15} = C + F + \bar{G}$$
$$S_{16} = \bar{C} + F + \bar{G}$$
$$S_{17} = D + \bar{F} + \bar{G}$$
$$S_{18} = \bar{D} + \bar{F} + \bar{G}$$

As previously stated, gates 30 require a voltage at all three inputs in order to obtain an output signal. To account for the no voltage signals such as $\bar{A}$, $\bar{B}$, $\bar{C}$, etc. digital code signal inverters 31 have been inserted in the appropriate inputs to the gate 30 whereby code translation is obtained in accordance with the foregoing schedule. The inverters (31) are conventional such as ordinary relays.

It should now be apparent that a discrete signal will appear at the output of one of the gates 30 depending on which of the sensors 15 has the highest signal. For example, if the signal $S_1$ is the strongest because its sensor 15 is receiving the largest amount of gamma radiation, an electrical signal $S_{11}$ will appear at the output of its respective gate 30.

Each of the outputs from the "AND" gates 30 are connected to a roll command programmer 32 contained in the automatic pilot unit 18. An overriding roll command signal will appear at the output of the programmer 32 which is indicative of the angular position about the aircraft 10 of the maximum output sensor 15. This is accomplished by a resistor 41 to which the outputs of the "AND" gates 30 are connected at tapped intervals. The electrical signals $S_{11}$ to $S_{18}$ are relatively high and equal voltages, and the resistance between each tapped interval is selected so that the output from the programmer 32 will vary linearly and incrementally from a relatively low voltage when signal $S_{11}$ is applied to the relatively high voltage when the signal $S_{18}$ is applied. Thus, each sensor 15 will produce a discrete incremental voltage at the output of the programmer 32 representing the overriding roll command.

The overriding signal is connected to one input of a time-holding relay 35; another input being derived from the normal mode of pilot commands. As shown in more detail in FIG. 7, these two inputs are selectively connected to the output of the relay 35 through a movable contact 43 which is normally connected to the normal mode. The overriding command signal from the programmer 32 is connected to the output when a relay coil 44 is energized. The coil 44 is energized whenever a sensor 15 signal appears at the output of the comparator 20 that produces signal H. Signal H passes through a threshold sensing device comprising a resistor 46 and Zener diode 47, then through an amplifier 48 to the coil 44 to ground. A holding circuit for the relay coil 44 includes a normally open contact 48 and a thermal cutout switch 49 which are connected in series from a fixed voltage E to the ungrounded terminal of the relay coil 44. The time before the holding circuit is de-energized is determined by the estimated maximum time between sensing the gamma radiation to the time of arrival of the pressure wave or gust produced by the nuclear explosion.

The output from the time-holding relay 35 is connected to one input of a roll computer 34 which compares either the normal mode or overriding command signal with another input from a roll altitude reference gyro 33. The gyro 33 operates a potentiometer 42 producing thereby a variable voltage output proportional to the actual roll attitude of the aircraft. Referring to FIG. 8, the actual roll attitude signal is connected to one input of a differential amplifier 51. The signal from relay 35 is connected to one input of a servo amplifier 52 which drives the wipers of potentiometers 53 and 54 through a servo motor 56. The potentiometer 53 provides a position feedback voltage and a generator 57 provides a rate feedback voltage to the servo amplifier 52. The potentiometer 54 is characterized like resistor 42 of the gyro 33 and provides thereby a command roll signal for comparison with the actual roll position. The error signal is produced at the output of the differential amplifier 51 and positions the ailerons 58 of the aircraft through an actuating motor 59. The automatic pilot 18 thereby produces a roll signal to the aircraft controls for executing aircraft roll in a direction and magnitude which will cause the wings of the aircraft 10 to move into the plane formed by the flight path vector 11 and the source of radiation.

Figure 3:
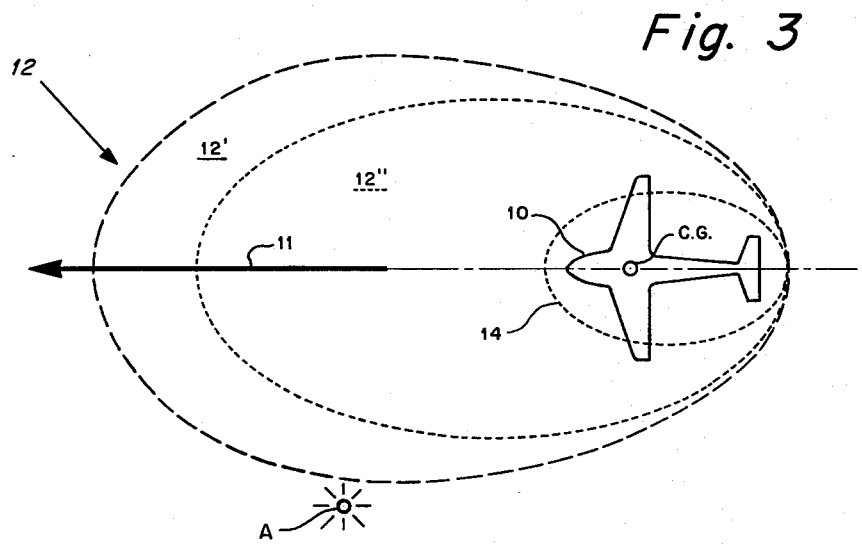
FIG. 3 represents an elevation view of the aircraft in flight of FIG. 1 after rolling to a least vulnerable orientation.

The method and operation of the apparatus of the present invention may be best summarized by the following example. If the aircraft 10 is traveling along the flight path vector 11 at a speed and altitude which produces the lethal volume 12, and a nuclear burst occurs in a vertical plane through the flight path vector 11 at a point A (FIGS. 1 and 2), the sensor 15 directly beneath the airplane 10 will substantially instantaneously detect the gamma rays produced by the explosion. A certain amount of dispersion of gamma rays occurs as it travels through atmosphere, so that the remaining sensors 15 may also detect a lesser amount of radiation, but the output signals of the remaining sensors 15 will be lesser in amplitude than those appearing in the lowermost sensor 15. Only the signal from the lowermost sensor 15 will pass to the automatic pilot 18 and it will be characterized to cause the automatic pilot 18 to promptly execute a roll maneuver to the aircraft 10 such that the wings will lie in a plane formed by the vector 11 and the point A, as shown in FIG. 3. In the aforementioned example, if the lowermost sensor 15 generated the signal $S_4$, a signal $S_{14}$ would appear at the input to the programmer 32 and produce a 90° roll command signal at the output thereof. This signal would be compared with a signal from the gyro 33 and an appropriate roll command signal would be generated at the output of the computer 34. This last generated signal will change the position of the aircraft surface controls to execute a roll appropriate for orienting the aircraft 10 into its least vulnerable position. The maneuver is completed before or at the time the gust generated by the explosion arrives at the aircraft 10.

The automatic pilot 18 will resume normal flight control after the sudden gust has passed safely beyond the airplane 10. Means for resuming normal control may be through conventional timing and pressure responsive devices, or the like.

It is thus seen that the method and apparatus of the present invention increases the survival probability of an airplane in flight from a nuclear explosion occurring within the near-miss region of an aircraft by detecting gamma radiation from the blast in sufficient time to maneuver the aircraft into its least vulnerable aspect before the sudden or impulse gust arrives.

Other uses of the gamma ray sensors 15 in the event of a nuclear burst for the purpose of increasing survival and mission effectiveness of airplanes are contemplated. For example, the gamma ray sensors may operate a filter to protect the pilot's eyes from the intense direct and reflected light following a nuclear explosion, or they may turn on the aircraft's electronic countermeasure equipment if theretofore silenced to decrease detection.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. Apparatus for the passive defense of an aircraft in flight to a near-miss nuclear burst, comprising:
   a plurality of sensor means solely responsive to nuclear radiation for producing discrete signals each indicative of a direction of nuclear radiation arranged to view substantially all of the spaces about the fuselage;
   discriminator means operatively connected to said sensor means for passing the strongest sensor signal therethrough;
   automatic pilot means operatively connected to said discriminator means for producing a control signal characterized to roll the aircraft an amount predetermined for said strongest sensor directional signal;
   whereby the aircraft will be maneuvered into its least vulnerable aspect with respect to the burst before the gust generated by the burst arrives at the aircraft.

2. Apparatus for the passive defense of an aircraft in flight to a near-miss nuclear burst, comprising:
   a plurality of sensors solely responsive to gamma radiation adapted to be mounted around the periphery of the fuselage of the aircraft for producing discrete signals each indicative of a direction of gamma radiation, said sensors being arranged to view radial spaces about the fuselage thereby affording substantially complete radiation surveillance;
   discriminator means operatively connected to said sensors for passing the strongest sensor signal therethrough;
   automatic pilot means operatively connected to said discriminator means for producing a control signal adapted to roll the aircraft an amount predetermined for said strongest sensor directional signal;
   whereby the aircraft will be maneuvered into its least vulnerable aspect with respect to the burst before the gust generated by the burst arrives at the aircraft.

3. Apparatus for maneuvering an airplane from its normal flight attitude so that its least vulnerable aspect faces the direction of a nuclear burst, comprising:
   an array of sensor means solely responsive to gamma radiation peripherally mounted around the fuselage of the aircraft for producing discrete signals indicative of nuclear radiation, said means being arranged to view substantially all of the space about the fuselage;
   discriminator means operatively connected to said sensor means for passing the strongest signal therethrough;
   automatic pilot means for producing an airplane roll signal at its output an amount predetermined for said sensor means signal;
   conductor means connecting the output of said sensor means to said discriminator means, and the output of said discriminator means to said automatic pilot means;
   whereby a nuclear burst within the surveyed region of said sensor means will substantially roll the wings of the airplane into the plane formed by the velocity vector of the aircraft and the center of the burst.

4. Apparatus for maneuvering an airplane from its normal flight attitude so that its least vulnerable aspect faces the direction of a nuclear burst, comprising:
   an array of sensors solely responsive to gamma radiation peripherally mounted around the fuselage of the aircraft for producing signals whose relative amplitudes are indicative of a direction of gamma radiation, said sensors being arranged to view radial spaces about the fuselage thereby affording substantially complete surveillance;
   an amplitude discriminator means for passing the strongest of a plurality of signals at its input to its output, first conductor means connecting the output from each of said sensors to the input of said discriminator means;
   automatic pilot means for producing an airplane roll signal at its output an amount predetermined for each of said input signals;
   second conductor means connecting the output of said discriminator means to an input of said automatic pilot means;
   whereby a nuclear burst within the surveyed region of any one of said gamma radiation sensors will substantially roll the wings of the airplane into the plane formed by the velocity vector of the aircraft and the center of the burst.

5. Apparatus as set forth in claim 1 wherein said automatic pilot means comprises:
   roll command programmer means receiving said strongest sensor signal and producing a discrete output signal indicative thereof;
   relay means having one signal input connected to the output of said programmer means, another signal input connected to receive normal flight commands, and a control input connected to receive said strongest output signal from said discriminator means for connecting said one signal input to the output at a threshold signal level;
   roll attitude reference gyro means having an output signal indicative of aircraft roll position; and
   roll computer means having inputs respectively connected to the outputs of said relay means and said gyro means for producing an aircraft surface control signal at the output thereof proportional to the difference in signal inputs.

6. Apparatus as set forth in claim 4 wherein said amplitude discriminator means comprises:
   a plurality of relays connected to said sensors for cascading the strongest sensor output signals to a plurality of outputs; and
   a plurality of AND gates operatively connected to said relay outputs for producing a fixed voltage at respective AND gate outputs corresponding to said sensors.

References Cited by the Examiner

UNITED STATES PATENTS

| | | | |
|---|---|---|---|
| 2,750,583 | 6/1956 | McCullough | 250—106 |
| 2,935,942 | 5/1960 | De Young et al. | 102—3 |
| 2,948,813 | 8/1960 | Osborne | 250—203 |
| 2,992,330 | 7/1961 | Cooper et al. | 250—106 |

FERGUS S. MIDDLETON, *Primary Examiner.*